(12) United States Patent
Liu et al.

(10) Patent No.: US 10,341,451 B2
(45) Date of Patent: Jul. 2, 2019

(54) CLOUD ORIENTED STREAM SCHEDULING METHOD BASED ON ANDROID PLATFORM

(71) Applicant: CENTRAL SOUTH UNIVERSITY, Changsha (CN)

(72) Inventors: Yaping Liu, Changsha (CN); Shaoyong Li, Changsha (CN); Yaoxue Zhang, Changsha (CN); Shuo Zhang, Changsha (CN); Haining Liao, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 126 days.

(21) Appl. No.: 15/674,535

(22) Filed: Aug. 11, 2017

(65) Prior Publication Data
US 2018/0338013 A1 Nov. 22, 2018

(30) Foreign Application Priority Data
May 19, 2017 (CN) .......................... 2017 1 0358605

(51) Int. Cl.
*H04L 29/08* (2006.01)
*H04L 29/06* (2006.01)
(Continued)

(52) U.S. Cl.
CPC .......... *H04L 67/2828* (2013.01); *H04L 67/26* (2013.01); *H04L 69/04* (2013.01);
(Continued)

(58) Field of Classification Search
CPC ..... H04L 67/10; H04L 67/1097; H04L 67/02; H04L 67/12; H04L 67/2828; H04L 67/26; H04L 65/4084; G06F 8/60; H04W 12/08
See application file for complete search history.

(56) References Cited

U.S. PATENT DOCUMENTS

| 8,769,063 B2 * | 7/2014 | Barton .................... H04L 41/00 709/220 |
| 9,117,087 B2 * | 8/2015 | Tan ........................ G06F 21/606 |

(Continued)

OTHER PUBLICATIONS

Stevens et al., On the Origin of Mobile Apps: Network Provenance for Android Applications, 12 pages (Year: 2016).*
(Continued)

*Primary Examiner* — Thuy Dao
(74) *Attorney, Agent, or Firm* — Gokalp Bayramoglu

(57) ABSTRACT

The present invention discloses a cloud-oriented stream scheduling method based on Android platform, which aims to solve the problem that the calculation and storage capability of the mobile terminal device are limited and the application has a low expandability. The technical solution of the present invention is to build a core scheduling routine and an App management routine in a mobile terminal device based on Android operation system, and build a cloud management service subsystem in cloud server to construct a cloud-oriented stream scheduling system based on the Android platform to make the mobile terminal device enabled to dynamically install or uninstall the applications according to security attribute, user behavior habit, network status and transmission quality, processing capability of current mobile terminal device, and timed task of the application and achieve the consistent application view on the level of the mobile terminal device.

10 Claims, 3 Drawing Sheets

(51) Int. Cl.
  *G06F 17/30* (2006.01)
  *G06Q 30/02* (2012.01)
  *H04M 3/42* (2006.01)
  *H04W 24/02* (2009.01)
  *H04W 24/10* (2009.01)
(52) U.S. Cl.
  CPC ....... *H04M 3/42161* (2013.01); *H04W 24/02* (2013.01); *H04W 24/10* (2013.01)

(56) References Cited

U.S. PATENT DOCUMENTS

| | | | | |
|---|---|---|---|---|
| 9,344,517 | B2* | 5/2016 | Shivadas | H04L 67/2861 |
| 9,392,077 | B2* | 7/2016 | Borzycki | G06F 21/6218 |
| 9,832,087 | B2* | 11/2017 | Pearce | H04L 43/08 |
| 9,942,189 | B2* | 4/2018 | Green | G06F 16/435 |
| 9,942,295 | B2* | 4/2018 | Rider | H04L 65/00 |
| 10,007,513 | B2* | 6/2018 | Malladi | G06F 8/70 |
| 10,248,087 | B2* | 4/2019 | Hall | G05B 15/02 |
| 2012/0185785 | A1* | 7/2012 | Avellan | H04N 21/222 715/760 |
| 2015/0295726 | A1* | 10/2015 | Bland | H04L 12/189 709/203 |
| 2018/0046720 | A1* | 2/2018 | Conde | G06F 16/34 |
| 2018/0337955 | A1* | 11/2018 | Aamir | G06F 11/3476 |

OTHER PUBLICATIONS

Suarez et al., An open source virtual globe framework for iOS, Android and WebGL compliant browser, 10 pages (Year: 2012).*
E. Holder, Cloud twin: interactive cross-platform replay for mobile applications, 2 pages (Year: 2013).*
Meng et al., Facilitating Reusable and Scalable Automated Testing and Analysis for Android Apps, 10 pages (Year: 2015).*

* cited by examiner

CLOUD ORIENTED STREAM SCHEDULING METHOD BASED ON ANDROID PLATFORM

CROSS REFERENCES TO RELATED APPLICATION

This application is based upon and claims priority to Chinese Patent Application No. CN 201710358605.1, filed on May 19, 2017, the entire contents of which are incorporated herein by reference.

TECHNICAL FIELD

The present invention relates to a method for improving the operating performance of a smart mobile terminal in order to enhance the processing capability of a resource-limited device in the field of pervasive computing and mobile computing.

BACKGROUND OF THE INVENTION

With the rapid development of Internet technology, all kinds of mobile devices, device for the Internet of Things, such as various types of pads, smartphones, all kinds of wearable devices, robots, unmanned aerial vehicles, sensors and devices for the Internet of Things have become the fastest growing front-end devices accessing the Internet. The access to mobile devices is more than the ordinary desktop computer. For the sake of simplicity, all kinds of mobile devices, a device for the Internet of Things are collectively referred to as the mobile terminal device in the present invention. The pervasive computing and mobile cloud computing are main forms of future computing. However, all kinds of mobile devices, devices for the Internet of Things have the following differences from traditional desktop terminals. First, all kinds of mobile devices, devices for the Internet of Things are battery-powered and have limited energy. Second, since the computing capacity and storage capacity are limited by space, the scalability is low and the computing and storage capabilities are limited. Therefore, in the use of mobile devices, especially in the mobile front-end devices that support a variety of applications like smartphones and smart watches, there are some performance issues like shortened standby time, slow response to the operation, loss of user data, and limited functional expansion, which are caused due to limited resources and many other factors of the device after using for a period of time.

At present, the main solutions to these problems are as follows. The first solution is to install a system monitoring software on the mobile terminal equipment to remind, by scanning the mobile terminal equipment, the user to timely clear the system garbage and uninstall the software which is not used frequently. This is the mainstream method in the current market, but it still cannot solve the problem of user data loss, slow response to the operation, and limited function expansion. The second solution is the method of Cyber Foraging. The method of Cyber Foraging mainly solves the problem of how the cloud service can continue providing services seamlessly when the mobile device moves or when the mobile device is recharged after being out of power. A representative of the method is the Cloudlet system proposed by the Carnegie Mellon University. However, the system does not completely solve the problem of the shortened standby time, the slower response to the operation, and the limited functional expansion of the mobile terminal device. The third solution is the method of calculation and uninstallation. In the method of calculation and uninstallation, the operating situation of the mobile terminal equipment is mainly monitored, when the computing capacity and the related resources of mobile terminal equipment cannot meet the requirements of the program operation, the program is uninstalled to the cloud to complete the calculation task. For example, when the app running on the smartphone is uninstalled to the cloud to complete the computing task, the smartphone only shows the result of the computing. The method is mainly based on a virtual machine technology of the cloud computing, the representative methods and systems are ThinkAir, MAUI, CloneCloud, and so on. In these studies, function, class, object, method, or thread that is computationally heavy in the program on a mobile device is mainly uninstalled from the mobile device and installed on the cloud for execution to optimize the performance of the mobile device. Although this method can solve the performance issues of the current mobile terminal device, it is not commercially available yet. The main drawback is that the movement of the function, the class, the object, the method, or the thread inside the program involves the execution of mobile code, and the control is very complex. Moreover, there is a high requirement for the bandwidth and stability of the network environment, such that the cost of calculation and uninstallation need to be carefully evaluated and checked for mobile devices before the code is moved and during the execution of code movement. Controlling the complexity of evaluation can significantly increase the inherent overhead of a mobile device. Moreover, moving the code can cause serious security risks. The increased control overhead to guard against the security risks and the inherent control overhead will result in the unenforceable implementation of such mobile-based calculation and uninstallation method. The fourth solution is the method of Wechat applet, Android applet. The method uses the ideas of stream computing such as a transparent calculation of "leave after run out", etc., to solve the problem of slow response to operation and limited functional expansion of the application software in mobile terminal devices. However, since both the Wechat applet and the Android applet belong to custom framework mode which combines the HTML5 and App programming in terms of the technical principle and the technical framework, the size of the program is strictly restricted, such that the applets can only replace some App having simple functions and cannot replace the App having slightly complicated functions.

No published literature and patent discloses a method for the mobile terminal device based on Android platform, which supports the APPs to efficiently operate in the mobile terminal device by a scheduling method combined with the background cloud service without limitation to the operation of the Apps. Both applet and general Android App are supported such that it is ensured that the operating performance of the mobile terminal device is always efficient, and the user experience is good.

SUMMARY OF THE INVENTION

The present invention provides a cloud-oriented stream scheduling method based on a customized Android platform for improving the operating performance, flexibility, and movability of the mobile terminal device in view of the problem of the limited computing and storage capacity of the mobile terminal device and the low scalability of the application. Moreover, there is no limit to the operation of the Apps, both applet and general Android App are supported, so as to ensure that the operating performance of the mobile terminal device is always efficient, and the user experience is good.

The technical solution of the present invention is as below.

A core scheduling routine and an App management routine are built in a mobile terminal device based on an Android operation system, and a cloud management service subsystem is built in a matched cloud server to construct a cloud-oriented stream scheduling system based on an Android platform. The mobile terminal device is enabled to dynamically install or uninstall applications according to the security attribute, the user behavior habit, the network status and transmission quality, the processing capability of the current mobile terminal device, and the timed task of the application, thereby improving the operation fluency. Moreover, a consistent application view is achieved in a level of mobile terminal devices, such that the flexibility and movability of the mobile device in a deployment are improved.

The present invention specifically including following steps.

The first step is to build a cloud-oriented stream scheduling system based on Android platform. The system is constructed by two layers. One layer is a cloud management service subsystem operated on a cloud server. The other layer is a core scheduling routine and an App management routine operated in a mobile terminal device. The cloud server is deployed with the only cloud management service subsystem in the whole network to provide services of Application downloading, strategy access scheduling, user configuration access, and user App status access for all of the mobile terminal devices connected to the cloud management service subsystem in a parallel manner, and the cloud management service subsystem is also mounted with a data center database. The cloud management service subsystem obtains access information needed to a mobile terminal device access operation by querying the data center database.

The data center database includes four data tables, which correspond to four services of the cloud management service subsystem, respectively. The four tables include: an Application data table, each table item of which is entitled <App classification identifier, App identifier, App installation package>; a scheduling strategy data table, each table item of which is entitled <user type identifier, scheduling strategy information>; a user configuration data table, each table item of which is entitled <user identifier, user configuration information>; an user App status data table, each table item of which is entitled <user identifier. App identifier, user App status information>.

The App classification identifier indicates a class to which the App belongs, such as social chat, audio and video playback, picture editing and so on; the App identifier is a unique identifier that indicates a kind of application to which the App belongs; an App package file is stored in the App installation package; The user type identifier indicates the class to which the user belongs, such as a teacher, a student, a manager, an employee, and each type of user has the same scheduling strategy; the user identifier is a unique identifier indicating the user of the mobile terminal device.

The scheduling strategy information comprises a display strategy, a timed task strategy, an operation mode strategy, and a status saving strategy of the App; the display strategy is a list of N1 records, the content of each of the N1 records is <App identifier, display manner>, the display manner indicates that an App display order corresponding to the App identifier is "fixed", "dynamically adjusted" or "preferential", and N1 is equal to the number of an App controlled by the display strategy; the timed task strategy is a list of M records, the content of each of the M records is <App identifier, operation time>, the App corresponding to the App identifier will operate automatically within a time specified by the operation time, and M is equal to the number of App controlled by the timed task strategy; the operation mode strategy is a list of K records, the contents of each of the K records is <App identifier, operation mode>, the operation mode indicates that the App corresponding to the App identifier is one-off "stream execution", "uninstallation prohibited" resident in system, or "dynamically uninstallation" determined by the core scheduling routine, and K is equal to the number of the App controlled by the operation mode strategy; the status saving strategy is a list with L records, the content of each of the L records is <App identifier, whether to save>, whether to save indicates whether the status information of the App corresponding to the App identifier needs to be uploaded to the cloud management service subsystem before uninstallation and whether the status information of the App corresponding to the App identifier is needed to be downloaded and restored to a mobile smart terminal currently used by a user after installation, and L is equal to the number of the App controlled by the status saving strategy.

The user configuration information is a data list with N2 records, the content of each of the N2 records is <App identifier, application using frequency, application display order>, the application using frequency records an average daily using frequency of the application corresponding to the App identifier after the App is installed, and the application display order indicates the order and the location that the App is displayed in the display list, N2 is equal to the number of applications that have been installed in the mobile terminal device used by the user.

The user App status information is a file that stores the contents related to the status and configuration of the App corresponding to the App identifier used by the user corresponding to the user identifier, so that the App status, at the time when the user is using it, can be recovered when the user re-installs the App. In terms of the Android system, an operation status of each App is mainly stored in a configuration file of the App in the mobile terminal device, these configuration files are located in three directories: the first one is a /data/data/<package name>/directory (package name refers to an App package name), the second one is a /sdcard/Android/data/<package name>/ directory, the third one refers to a predetermined directory in a non-system partition of the mobile terminal device, and the predetermined directory designated by the App has rights to read and write. Specifically, the first directory is a main configuration file of the App and has a maximum impact on an operation efficiency of the system. The first directory will be emptied when the user uninstalls the application or manually clears an application data; the latter two directories are generally used to store ordinary data of the App and only can be manually deleted by the user. Therefore, the user App status information is a file packaged from the three directories. A process of saving the user App status information is exactly a process of saving the file and a process of restoring the user App status is exactly a process of unpacking and recovering the file back to the three directories stated above.

The core scheduling routine and the App management routine are running on each of the mobile terminal devices, wherein the core scheduling routine provides functions of processing scheduling strategy, silently installing or uninstalling App, and dynamically adjusting Application for the mobile terminal device and performs specific scheduling tasks of the stream computing. The App management routine provides functions of processing user configuration, integrating and displaying App, pre-processing App before installation and uninstallation (i.e., downloading apk installation file, downloading user App status information, uploading user App status information) for the mobile terminal device.

An HTTP (S) protocol is used between the cloud management service subsystem and each of the core scheduling routine and the App management routine for allowing a communication. An Android internal broadcast mechanism is used between the core scheduling routine and the App management routine for allowing the communication to asynchronously implement internal functions in a message-driven manner.

The cloud management service subsystem includes a global application management module, a scheduling strategy management module, a user configuration management module, and a user App status management module. The core scheduling routine includes a terminal strategy processing module, an App silent operation module, and an application dynamic scheduling module. The App management routine includes a terminal configuration processing module, an application preprocessing module, and an App integration display module.

The global application management module is connected to the application preprocessing module, the App integration display module and the data center database. The global application management module receives the request (the parameter is the App identifier) for downloading the application installation package sent by the application preprocessing module, finds an App installation package URL corresponding to the App identifier from the Application data table, and sends the App installation package corresponding to the App installation package URL to the Application preprocessing module. The global application management module also receives the request (the parameter is the App classification identifier) for downloading the App list sent by the App integration display module, and finds all Apps belonging to the App classification identifier from the Application data table to form an App list (which includes two pieces of information, i.e., the App identifier and the App classification identifier in the Application data table), and sends the App list to the App integration display module.

The scheduling strategy management module is connected to the terminal strategy processing module and the data center database. The scheduling strategy management module receives the request (the parameter is the user type identifier) for downloading the scheduling strategy sent by the terminal strategy processing module, finds the scheduling strategy information corresponding to the user type identifier from the scheduling strategy data table, and sends the scheduling strategy information to the terminal strategy processing module.

The user configuration management module is connected to the terminal configuration processing module and the data center database. The user configuration management module receives the request (the parameter is the user identifier) for downloading the user configuration information sent by the terminal configuration processing module, finds the user configuration information corresponding to the user identifier from the user configuration data table, and sends the user configuration information to the terminal configuration processing module. The user configuration management module also receives the request (the parameters are the user identifier and the user configuration information) for uploading the user configuration information sent by the terminal configuration processing module and saves the user configuration information into the table item corresponding to the user identifier in the user configuration data table.

The user App status management module is connected to the application preprocessing module and the data center database. The user App status management module receives the request (the parameters are the user identifier and the App identifier) for downloading the user App status information sent by the application preprocessing module, finds the user App status information corresponding to the user identifier and the App identifier from the user App status data table, and sends the user App status information to the application preprocessing module. The user App status management module also receives the request (the parameters are the user identifier, the App identifier, the user App status information) for uploading the user App status information sent by the application preprocessing module, and saves the user App status information into the table items corresponding to the user identifier and the App identifier in the user App status data table.

The terminal strategy processing module is connected to the scheduling strategy management module, the application dynamic scheduling module and the terminal configuration processing module. The terminal strategy processing module sends the request (the parameter is the user type identifier) for downloading the scheduling strategy to the scheduling strategy management module periodically or after receiving the request for downloading the scheduling strategy sent by the terminal configuration processing module, receives the scheduling strategy information returned by the scheduling strategy management module, analyzes the scheduling strategy information to obtain the display strategy, the timed task strategy, the operation mode strategy, and the status saving strategy of the App, and saves these strategies in the mobile terminal device to which the terminal strategy processing module belongs, for using at the time when the dynamic scheduling module carries out the dynamic scheduling computing. The terminal strategy processing module also receives the request (the parameter is the App identifier) for querying the App status saving strategy sent by the terminal configuration processing module. The terminal strategy processing module finds the status saving strategy of the application corresponding to the App identifier from the status saving strategy of the scheduling strategy information and sends the status saving strategy to the terminal configuration processing module.

The App silent operation module is connected to the application dynamic scheduling module and the terminal configuration processing module, in order to complete the installation and uninstallation task of the application in the background, without disturbing the user's use. The module receives the request (the parameter is the local installation package path) for App silent installation, sent by the application dynamic scheduling module or the terminal configuration processing module, and completes the silent installation task by obtaining the installation package file to be installed through the local installation package path. The module also receives the request (the parameter is the to-be-uninstalled App identifier) for App silent uninstallation sent by the application dynamic scheduling module and completes the silent uninstallation task according to the obtained to-be-uninstalled App identifier.

The application dynamic scheduling module is connected to the terminal strategy processing module, the App silent operation module, the application preprocessing module, and the App integration display module. During the operating process of the mobile terminal device, the module periodically completes the application dynamic scheduling tasks according to the display strategy, the timed task strategy, the operation mode strategy, and the status saving strategy of the App stored in the current mobile terminal device by the terminal strategy processing module with reference to the performance and security requirements of the mobile terminal device. The application dynamic scheduling module sends a request (the parameter is the local installation package path) for installing the App silently, to the App silent operation module, to trigger the App silent operation module to complete the installation task. The application dynamic scheduling module sends a request (the parameter is the to-be-uninstalled App identifier) for uninstalling the App silently, to the App silent operation module, to trigger the App silent operation module to complete the uninstall task. The application dynamic scheduling module sends a request (the parameter is the App identifier) for obtaining the application installation package to the application preprocessing module to obtain the application installation package returned by the application preprocessing module. The application dynamic scheduling module sends a request (the parameter is the App identifier) for saving the user App status information to the application preprocessing module, to trigger the application preprocessing module to save the user App status information of the application corresponding to the App identifier of the user using the current mobile terminal device. The application dynamic scheduling module sends a request (the parameter is the App identifier) for recovering the user App status information, to the application preprocessing module, to trigger the application preprocessing module to recover the user App status information of the application corresponding to the App identifier of the user using the current mobile terminal device. The application dynamic scheduling module sends a request for updating the application display list, to the App integration display module, to trigger the App integration display module to update the application display list of the current mobile terminal device. The application dynamic scheduling module also sends a request (the parameter is the App identifier) for adjusting the App list order, to the App integration display module, to trigger the App integration display module to adjust the display order of the application corresponding to the App identifier in the application display list of the current mobile terminal device.

The terminal configuration processing module is connected to the user configuration management module, the terminal strategy processing module, the App silent operation module, the application preprocessing module and the App integration display module. The terminal configuration processing module periodically sends a request (the parameters are the user identifier and the user configuration information) for uploading the user configuration information to the user configuration management module, to send the user configuration information to the cloud server, so that the user can obtain a consistent application view on different mobile terminal devices, such that the user's ability of migrating between different mobile terminal devices is improved. When the user binds with the mobile terminal device, the terminal configuration processing module sends a request for downloading the scheduling strategy to the terminal strategy processing module, sends a request for updating the global App list to the App integration display module, sends a request (the parameter is the user identifier) for downloading the user configuration information to the user configuration management module, receives and analyzes the user configuration information returned by the user configuration management module to obtain the list of Apps installed on other mobile terminal devices used by the user, and then installs the application corresponding to each record of the list of installed Apps. The terminal configuration processing module sends a request (the parameter is the App identifier) for querying the App status saving strategy to the terminal strategy processing module to obtain the App status saving strategy returned by the terminal strategy processing module. If the App status saving strategy requires recovering the user App status information, a request for recovering the user App status information is sent to the application preprocessing module. The terminal configuration processing module sends a request (the parameter is the App identifier) for obtaining the application installation package to the application preprocessing module to obtain the installation package path returned by the application preprocessing module and uses the installation package path as a parameter to send the request for App silent installation to the App silent operation module. The terminal configuration processing module sends a request for updating the application display list to the App integration display module to trigger the App integration display module to update the application display list.

The application preprocessing module is connected to the global application management module, the user App status management module, the application dynamic scheduling module, and the terminal configuration processing module. The application preprocessing module receives the request (the parameter is the App identifier) for obtaining the application installation package sent by the application dynamic scheduling module and the terminal configuration processing module, uses the App identifier in the request for obtaining the application installation package as a parameter to send a request (the parameter is the App identifier) for downloading the application installation package to the global application management module, then saves the application installation package returned from the global application management module as the local application installation package, and returns the application installation package back to the application dynamic scheduling module and the terminal configuration processing module. The application preprocessing module receives a request (the parameter is the App identifier) for recovering the user App status information sent by the application dynamic scheduling module and the terminal configuration processing module, uses the App identifier in the request for recovering the user App status information and the user identifier of the user using the current mobile terminal device as parameters to send the request (the parameters are the user identifier, the App identifier) for downloading the user App status information to the user App status management module, and recovers the user App status information to the current mobile terminal device after receiving the user App status information returned from the user App status management module. The application preprocessing module also receives a request (the parameter is the App identifier) for saving the user App status information sent by the application dynamic scheduling module and the terminal configuration processing module, obtains the App status information of the designated App identifier from the mobile terminal device, and sends the request (the parameters are the user identifier, the App identifier, and the user App status information) for uploading the user App status information to the user App status management module.

The App integration display module is connected to the global application management module, the application dynamic scheduling module, and the terminal configuration processing module. The App integration display module is used for integrating and displaying the Applications that have already been installed on the mobile terminal device and the available App list obtained from the global application management module on the same interface of the mobile terminal device to provide the user with a unified and consistent view and operation entry for applications. The App integration display module sends a request (the parameter is the App classification identifier) for downloading the App list to the global application management module periodically or after receiving the request for updating the global App list sent by the terminal configuration processing module, obtains the available App list (including two pieces of information, the App identifier and the App classification identifier) from the global application management module, saves the App list in the related mobile terminal device, combines this App list with the installed App list of the related mobile terminal device (i.e. the operation of adding information of the application which is not installed on the current mobile terminal in the App list obtained from the global application management module to the installed App list of the current mobile terminal to form a new App list), and displays the combined list in the application display list of the related mobile terminal device to provide the user with an interface for running the application. The App integration display module also receives the request for updating the application display list sent by the application dynamic scheduling module and the terminal configuration processing module, combines the installed App list of the related mobile terminal device with the App list obtained from the global application management module and stored in the current mobile terminal device to display the combined list in the application display list of the mobile terminal device. The App integration display module also receives the request (the parameter is the App identifier) for adjusting the App list order sent by the application dynamic scheduling module, adjusts the application corresponding to the App identifier in the application display list of the related mobile terminal device to a front end of the application display list of the mobile terminal device, and displays the application.

The second step is that the cloud management service subsystem is activated and the data center database is initialized. A system administrator adds the Application information to the Application data table, adds the scheduling strategy information of different types of users to the scheduling strategy data table, and adds the user and the default user configuration information to the user configuration data table through the global application management module, and initializes the user APP status data table to be voided to get data support ready for all mobile terminal devices.

The third step is that the mobile terminal devices are operated in parallel under the support of the cloud-oriented stream scheduling system based on a customized Android platform. The third step further includes following steps.

3.1 The terminal configuration processing module authenticates the binding status of the related mobile terminal device by local status information of the mobile terminal device. The binding status of the mobile terminal device being "bound" means that a user has logged on to use the mobile terminal device, and the binding status being "unbound" means that the user has not logged on to use the mobile terminal device. The core scheduling routine and the App management routine operated on the mobile terminal device can obtain the user identifier and the user type identifier of the current user by the local status information of the mobile terminal device. If the current mobile terminal device is in the "unbound" status, the process goes to 3.2, if the current mobile terminal device is in the "bound" status, the process goes to 3.3 directly.

3.2 The terminal configuration processing module receives the user identifier information from a keyboard or a touch screen and binds with the mobile terminal device, wherein this step further includes the following steps.

3.2.1 The terminal configuration processing module sends a request (the parameter is the user identifier) for downloading the user configuration information to the user configuration management module to obtain the user configuration information returned by the user configuration management module.

3.2.2 The terminal configuration processing module reads the to-be-installed App list from the user configuration information and successively processes, from the first App record in the to-be-installed App list, each record in the to-be-installed App list, i.e. the installation is conducted according to the to-be-installed App list. This step further includes the following steps.

3.2.2.1 The terminal configuration processing module sends a request (the parameter is the App identifier) for querying the App status saving strategy to the terminal strategy processing module, to obtain the status saving strategy of the current to-be-installed App. If the obtained App status saving strategy is to recover the user App status information, a request (the parameter is the App identifier) for recovering the user App status information is sent to the application preprocessing module, the process goes to 3.2.2.2; otherwise, the process goes to 3.2.2.3 directly.

3.2.2.2 The application preprocessing module receives the request (the parameter is the App identifier) for recovering the user App status information sent by the terminal configuration processing module, sends a request (the parameters are the user identifier and the App identifier) for downloading the user App status information to the user App status management module, and recover the user App status information to the current mobile terminal device after receiving the user App status information returned back by the user App status management module.

3.2.2.3 The terminal configuration processing module sends a request (the parameter is the App identifier) for obtaining the application installation package to the application preprocessing module.

3.2.2.4 The application preprocessing module receives the request (the parameter is the App identifier) for obtaining the application installation package sent by the terminal configuration processing module and sends the request (the parameter is the App identifier) for downloading the application installation package to the global application management module by using the App identifier as the parameter, saves the application installation package returned by the global application management module as a local installation package file, and returns the local installation package path to the terminal configuration processing module.

3.2.2.5 The terminal configuration processing module receives the local installation package path, and sends the request (the parameter is the local installation package path) for the App silent installation to the App silent operation module with the path as the parameter. The App silent operation module receives the request (the parameter is the local installation package path) for the App silent installation sent by the terminal configuration processing module and executes an operation of App silent installation.

3.2.2.6 The terminal configuration processing module determines whether the record is the last record in the to-be-installed App list. If yes, the process goes to 3.2.3;

otherwise, the process goes to 3.2.2.1 to process the next record in the to-be-installed App list.

3.2.3 The terminal configuration processing module sends a request for updating the global App list to the App integration display module. The App integration display module sends the request for downloading the App list to the global application management module after receiving the request, obtains the App list returned from the global application management module, stores the App list in the mobile terminal device, combines this App list with the installed App list of the mobile terminal device, and displays the combined list in the application display list of the related mobile terminal device.

3.3 The terminal configuration processing module sets the local status information of the related mobile terminal device as a "bound" status.

3.4 The terminal configuration processing module, the terminal strategy processing module, the App integration display module, and the application dynamic scheduling module are operated in parallel. The terminal configuration processing module periodically uploads the user configuration information to the cloud server according to the method described in 3.4.1. The terminal strategy processing module periodically downloads the scheduling strategy from the cloud server according to the method described in 3.4.2. The App integration display module periodically integrates the App list according to the method described in 3.4.3. The dynamic scheduling module periodically carries out application dynamic scheduling according to the method described in 3.4.4. Moreover, when an App on the mobile terminal device is terminated, the application dynamic scheduling module carries out the scheduling according to the method described in 3.4.5. When the mobile terminal device enters the working status of "bound", the terminal configuration processing module waits for the reception of a user's operational instruction according to the method described in 3.4.6. The operation is carried out according to different instructions, and this step further includes the following steps (3.4.1, 3.4.2, 3.4.3, 3.4.4, 3.4.5, 3.4.6 are conducted in parallel, there is no specific order).

3.4.1 The terminal configuration processing module periodically (the user customizes the time as daily or hourly according to an energy consumption and traffic) sends the request for uploading the user configuration information to the user configuration management module (the parameters are the user identifier, the user configuration information) using a built-in timer of the Android system to upload the user configuration information to the cloud server.

3.4.2 The terminal strategy processing module periodically sends the request (the parameter is the user type identifier) for downloading the scheduling strategy to the scheduling strategy management module by using the built-in timer of the Android system, receives the scheduling strategy information returned by the scheduling strategy management module, analyze the scheduling strategy information to obtain the display strategy, the timed task strategy, the operation mode strategy, and the status saving strategy of the App, and saves these strategies in the current mobile terminal device for use when the dynamic scheduling module conducts the dynamic scheduling calculation.

3.4.3 The App integration display module periodically sends the request for downloading the App list to the global application management module using the built-in timer of the Android system, obtains the App list from the global application management module, saves the App list in the related mobile terminal device, combines the App list with the installed App list of the related mobile terminal device, and displays the combined list in the application display list of the related mobile terminal device.

3.4.4 The application dynamic scheduling module uses the built-in timer of the Android system to periodically carry out the application dynamic scheduling according to the display strategy, the timed task strategy, the operation mode strategy, and the status saving strategy of the App stored in the current mobile terminal device, by the terminal strategy processing module with reference to the requirements on performance and safety of the mobile terminal device. This step further includes the following steps.

3.4.4.1 The application dynamic scheduling module obtains the App, which needs to be periodically operated, according to the timed task strategy. If the App has been installed, the App runs directly, then the process goes to 3.4.4.2 to continue the scheduling task. If the App is not installed, the process goes to 3.5 to conduct the installation operation.

3.4.4.2 The Application dynamic scheduling module reads the display strategy to determine whether there is a newly added App needing "priority display" in the display strategy or not. If yes, the process goes to 3.8 to adjust the display order of the application in the application display list; otherwise, the process goes to 3.4.4.3 to continue the scheduling task.

3.4.4.3 The application dynamic scheduling module reads memory usage and system space usage of the related mobile terminal device through an API (Application Programming Interface) of the system. If the memory usage is greater than a memory threshold or the system space usage greater than a spatial threshold (the memory threshold is 60%, the spatial threshold is 75%), the installed application list of the system is searched to obtain the App which has the operation mode strategy of "dynamic uninstall", is not running currently and has the least using frequency per day. Then the process goes to 3.6 to uninstall this App; otherwise the process goes to 3.4.4 to wait for the next implementation of the periodic application dynamic scheduling task of the application dynamic scheduling module.

3.4.5 When the application dynamic scheduling module monitors termination of an App of the related mobile terminal device through the API of the system, the application dynamic scheduling module obtains the operation mode of the App according to the operation mode strategy. If the operation mode of the App is "stream execution", the process goes to 3.6 to perform the uninstall operation; otherwise, the process goes to 3.4.5 to wait for termination of the next App.

3.4.6 The terminal configuration processing module receives user's operation from the keyboard or the touch screen. If the user needs to remove the binding with the current mobile terminal device, the process goes to 3.7; if the user wants to turn off the power, the process goes to 3.9; if no operation is needed, then the process goes to 3.4.6 to continue to wait for the user's operation.

3.5 The application dynamic scheduling module conducts the silent installation task. This step further includes the following steps.

3.5.1 The application dynamic scheduling module determines whether the status information of the to-be-installed application needs to be recovered according to the status saving strategy obtained from 3.4.2. If yes, the process goes to 3.5.2, if not, the process goes to 3.5.3 directly.

3.5.2 The application dynamic scheduling module sends the request (the parameter is the App identifier) for recovering the user App status information to the application preprocessing module. The application preprocessing module sends a request (the parameters are the user identifier and the App identifier) for downloading the user App status information to the user App status management module after receiving the request for recovering the user App status information. The application preprocessing module recovers the user App status information to the current mobile terminal device after receiving the App status information returned by the user App status management module.

3.5.3 The application dynamic scheduling module sends the request (the parameter is the App identifier) for obtaining the application installation package to the application preprocessing module. After receiving the request for obtaining the application installation package, the application preprocessing module sends the request (the parameter is the App identifier) for downloading the application installation package to the global application management module.

The application preprocessing module receives the application installation package returned by the global application management module, saves the application installation package as the local installation package file, and returns the local installation package path to the application dynamic scheduling module.

3.5.4 The application dynamic scheduling module obtains the local installation package path in 3.5.3 and sends the request (the parameter is the local installation package path) for App silent installation to the APP silent operation module. The App silent operation module completes the silent installation task through the installation package file obtained from the local installation package path after receiving the request for silent installation, and sends the request for updating the application display list to the App integration display module.

3.5.5 The App integration display module receives the request for updating the application display list sent by the application dynamic scheduling module, combines the installed App list of the related mobile terminal device with the App list obtained from the global application management module in step 3.4.3 (i.e. the App list before the combination in step 3.4.3), and displays the combined list in the application display list of the mobile terminal device.

3.5.6 Go to 3.4.4 to wait for the next implementation of the periodic application dynamic scheduling task of the application dynamic scheduling module.

3.6 The application dynamic scheduling module conducts the application silent uninstallation task. This step further includes the following steps.

3.6.1 The application dynamic scheduling module determines whether the status information of the to-be-uninstalled application needs to be saved according to the status saving strategy obtained in 3.4.2. If yes, the process goes to 3.6.2, otherwise, the process goes to 3.6.3 directly.

3.6.2 The application dynamic scheduling module sends a request for saving the user App status information to the application preprocessing module. The application preprocessing module receives the request, and sends the request for uploading the user App status information to the user App status management module. The user App status management module receives the request for uploading the user App status information sent by the application preprocessing module, and saves the user App status information into the user App status data table.

3.6.3 The application dynamic scheduling module sends the request for App silent uninstallation to the App silent operation module. The App silent operation module completes the silent uninstallation task according to the obtained to-be-uninstalled App identifier after receiving the request for App silent uninstallation, and sends the request for updating the application display list to the App integration display module.

3.6.4 The App integration display module receives the request for updating the application display list sent by the application dynamic scheduling module, combines the installed App list of the mobile terminal device with the App list stored in the current mobile terminal device and obtained from the global application management module in step 3.4.3, and displays the combined list in the application display list of the mobile terminal device.

3.6.5 Go to 3.4.4 to wait for the application dynamic scheduling module to perform the periodic application dynamic scheduling task for the next time.

3.7 The terminal configuration processing module performs the task of removing the user from the binding with the current mobile terminal device. This step further includes the following steps.

3.7.1 The terminal configuration processing module sends the request (the parameters are the user identifier and the user configuration information) for uploading the user configuration information to the user configuration management module, and uploads the user configuration information to the cloud server.

3.7.2 The terminal configuration processing module obtains the locally installed App list from the user configuration information, successively processes, starting from the first record in the installed App list, each of the installed App records in the list. This step further includes the following steps.

3.7.2.1 The terminal configuration processing module sends the request (the parameter is the App identifier) for querying the App status saving strategy to the terminal strategy processing module to obtain the status saving strategy of the current to-be-uninstalled App. If the obtained App status saving strategy is to save the user App status information, the request for saving the user App status information is sent to the application preprocessing module, then the process goes to 3.7.2.2; otherwise the process goes to 3.7.2.3.

3.7.2.2 The application preprocessing module sends the request (the parameter is the user identifier, the App identifier, and the user App status information) for uploading the user App status information to the user App status management module to upload the user App status information to the cloud server, after receiving the request (the parameter is the App identifier) for saving the user App status information sent from the terminal configuration processing module.

3.7.2.3 The terminal configuration processing module determines whether the record is the last record in the installed App list. If yes, the process goes to 3.7.3; otherwise, the process goes to 3.7.2.1 to process the next record in the list.

3.7.3 The terminal configuration processing module clears the data of the mobile terminal device and restores the mobile terminal device to the factory settings.

3.7.4 Go to 3.2 to wait for the user to bind with the mobile terminal device.

3.8 The App integration display module adjusts the display order of the application display list. This step further includes the following steps.

3.8.1 The application dynamic scheduling module sends the request (the parameter is the App identifier) for adjusting the App list order to the App integration display module.

3.8.2 The App integration display module receives the request (the parameter is the App identifier) for adjusting the App list order sent from the application dynamic scheduling module, obtains the App identifier of the to-be-adjusted application, adjusts the application corresponding to the App identifier to be displayed at a front end of the application display list of the current mobile terminal device.

3.8.3 Go to 3.4.4 to wait for the application dynamic scheduling module to perform the periodic application dynamic scheduling task for the next time.

3.9 The mobile terminal device is shut down and the process is finished.

The present invention can achieve the following technical effects.

1. The present invention can support the changeable stream computing of any App without requiring the App to satisfy an applet framework, such as an Android applet, or a WeChat applet.

2. As a result of using the scheduling method combining the App of the mobile terminal device with the App stored in the background cloud end, the App elimination strategy of the mobile terminal device may be determined with assistance of user's habits, such that the performance of the mobile smart terminal device can be effectively improved and the smooth operation of the device is ensured without influencing the user's experience.

The present invention can be widely applied to the mobile smart terminal devices using the Android operating system, such as smartphones, smart watches and the like.

DETAILED DESCRIPTION OF THE INVENTION

Figure 1:
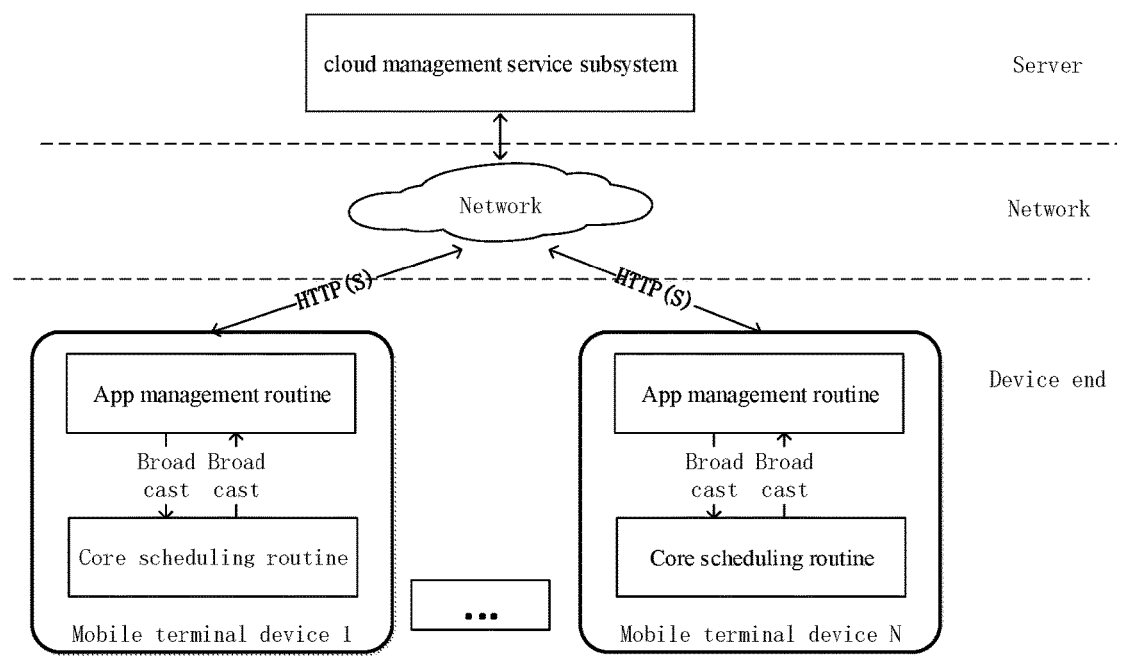
FIG. 1 is an overall structural diagram of a cloud-oriented stream scheduling system based on the Android platform and constructed in the first step of the present invention.

FIG. 1 is an overall structural diagram of a cloud-oriented stream scheduling system based on the Android platform and constructed in the first step of the present invention. The system is constructed by two layers. One layer is a cloud management service subsystem operated on a cloud server. The other layer is a core scheduling routine and an App management routine operated in a mobile terminal device. The cloud server is deployed with the only cloud management service subsystem in the whole network to provide services of Application downloading, strategy access scheduling, user configuration access, and user App status access for all of the mobile terminal devices connected to the cloud management service subsystem in a parallel manner. The core scheduling routine and the App management routine run on each mobile terminal devices, wherein the core scheduling routine provides functions of processing scheduling strategy, silently installing or uninstalling App, and dynamically adjusting Application for the mobile terminal device and executes specific scheduling tasks for the stream computing. The App management routine provides functions of processing user configuration, integrating and displaying App, and pre-processing before installation and uninstallation of App (i.e., downloading apk installation file, downloading user App status information, uploading user App status information) for the mobile terminal device. HTTP(S) protocol is used between the cloud management service subsystem and each of the core scheduling routine and the App management routine for communication. An Android internal broadcast mechanism is used between the core scheduling routine and the App management routine for communication to asynchronously implement internal functions in a message-driven manner.

Figure 2:
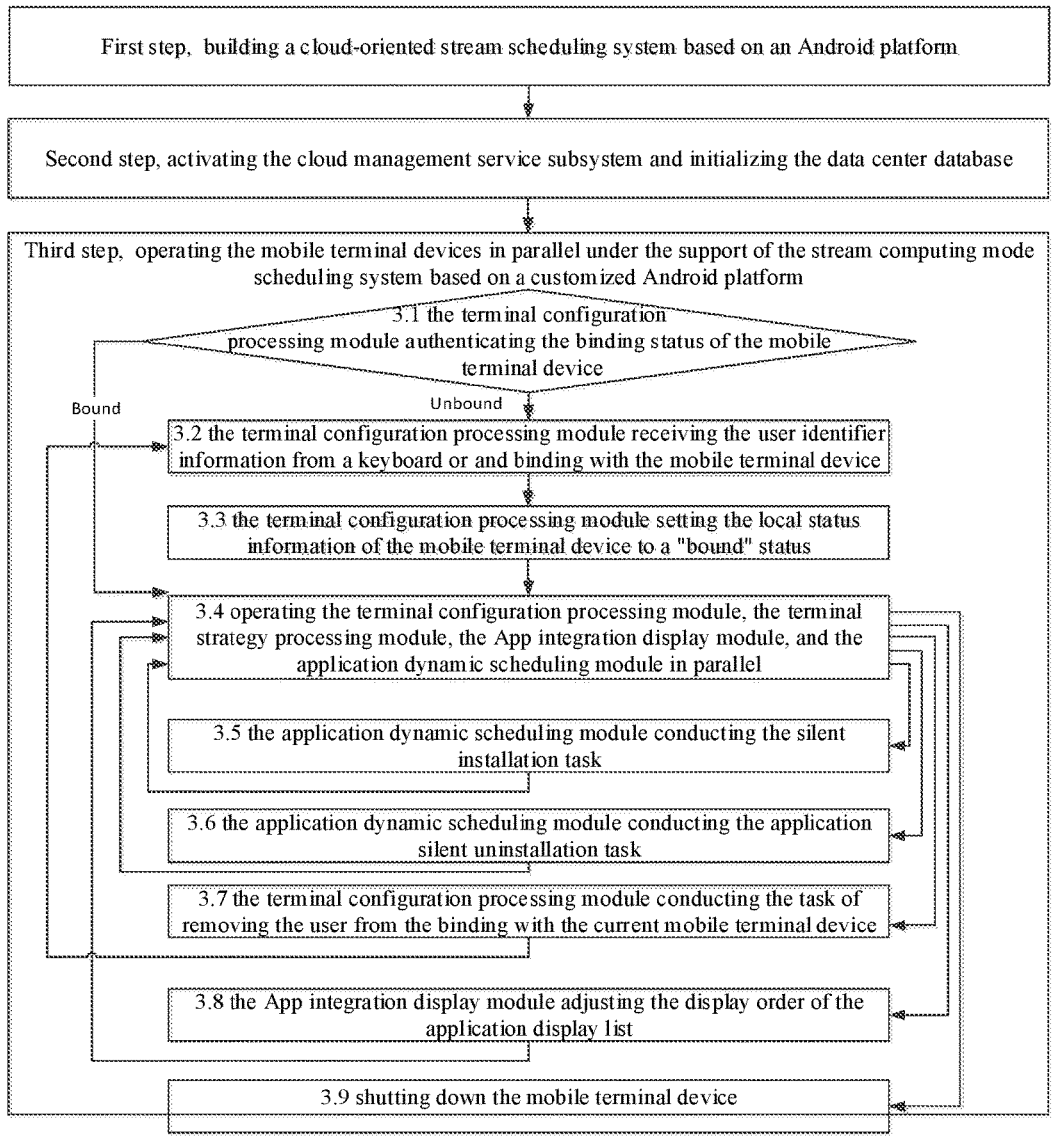
FIG. 2 is an overall flow diagram of the present invention.

FIG. 2 is an overall flow diagram of the present invention, and the present invention includes the following steps.

Figure 3:
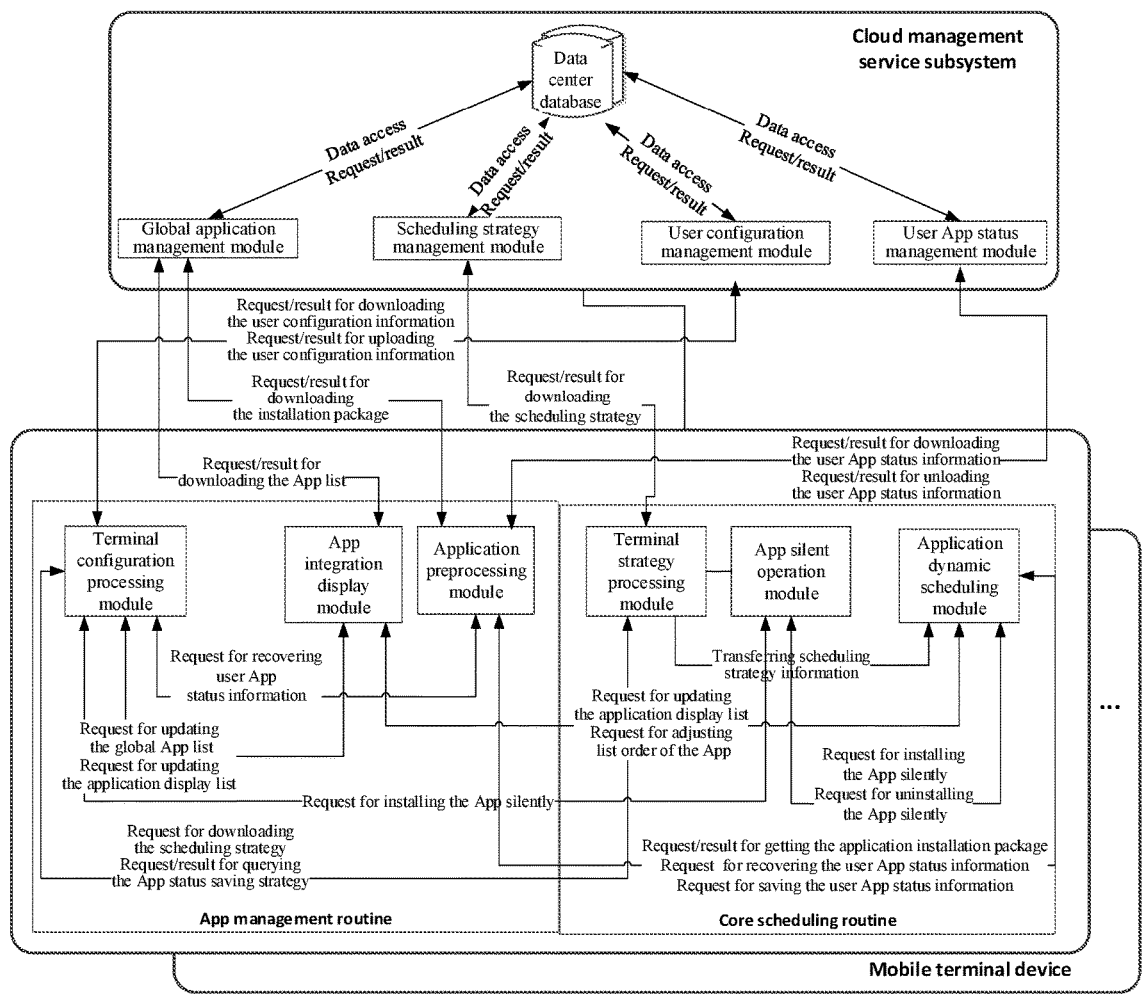
FIG. 3 is a logical structural diagram of software in a cloud-oriented stream scheduling system based on the Android platform of the present invention.

The first step is to build a cloud-oriented stream scheduling system based on Android platform. As shown in FIG. 3, the system includes two layers. One layer is a cloud management service subsystem operated on a cloud server. The other layer is a core scheduling routine and an App management routine operated in the mobile terminal device. The cloud server is deployed with the only cloud management service subsystem in the whole network to provide services of Application downloading, strategy access scheduling, user configuration access, and user App status access for all the mobile terminal devices connected to the cloud management service subsystem in a parallel manner. A data center database is installed on the cloud management service subsystem. The cloud management service subsystem obtains access information needed in a mobile terminal device access operation by querying the data center database.

The data center database includes four data tables, which correspond to four services of the cloud management service subsystem, respectively. The four tables include: an Application data table, each table item of which is entitled <App classification identifier, App identifier, App installation package>; a scheduling strategy data table, each table item of which is entitled <user type identifier, scheduling strategy information>; a user configuration data table, each table item of which is entitled <user identifier, user configuration information>; an user App status data table, each table item of which is entitled <user identifier, App identifier, user App status information>.

The core scheduling routine and the App management routine are running on each of the mobile terminal devices, wherein the core scheduling routine provides functions of processing scheduling strategy, silently installing or uninstalling App, and dynamically adjusting Application for the mobile terminal device and performs specific scheduling tasks of the stream computing. The App management routine provides functions of processing user configuration, integrating and displaying App, pre-processing App before installation and uninstallation (i.e., downloading apk installation file, downloading user App status information, uploading user App status information) for the mobile terminal device.

An HTTP (S) protocol is used between the cloud management service subsystem and each of the core scheduling routine and the App management routine for allowing a communication. An Android internal broadcast mechanism is used between the core scheduling routine and the App management routine for allowing the communication to asynchronously implement internal functions in a message-driven manner.

The cloud management service subsystem includes a global application management module, a scheduling strategy management module, a user configuration management module, and a user App status management module. The core scheduling routine includes a terminal strategy processing module, an App silent operation module, and an application dynamic scheduling module. The App management routine includes a terminal configuration processing module, an application preprocessing module, and an App integration display module.

The global application management module is connected to the application preprocessing module, the App integration display module and the data center database. The global application management module receives the request (the parameter is the App identifier) for downloading the application installation package sent by the application preprocessing module, finds an App installation package URL corresponding to the App identifier from the Application data table, and sends the App installation package corresponding to the App installation package URL to the Application preprocessing module. The global application management module also receives the request (the parameter is the App classification identifier) for downloading the App list sent by the App integration display module, and finds all Apps belonging to the App classification identifier from the Application data table to form an App list (which includes two pieces of information, i.e., the App identifier and the App classification identifier in the Application data table), and sends the App list to the App integration display module.

The scheduling strategy management module is connected to the terminal strategy processing module and the data center database. The scheduling strategy management module receives the request (the parameter is the user type identifier) for downloading the scheduling strategy sent by the terminal strategy processing module, finds the scheduling strategy information corresponding to the user type identifier from the scheduling strategy data table, and sends the scheduling strategy information to the terminal strategy processing module.

The user configuration management module is connected to the terminal configuration processing module and the data center database. The user configuration management module receives the request (the parameter is the user identifier) for downloading the user configuration information sent by the terminal configuration processing module, finds the user configuration information corresponding to the user identifier from the user configuration data table, and sends the user configuration information to the terminal configuration processing module. The user configuration management module also receives the request (the parameters are the user identifier and the user configuration information) for uploading the user configuration information sent by the terminal configuration processing module and saves the user configuration information into the table item corresponding to the user identifier in the user configuration data table.

The user App status management module is connected to the application preprocessing module and the data center database. The user App status management module receives the request (the parameters are the user identifier and the App identifier) for downloading the user App status information sent by the application preprocessing module, finds the user App status information corresponding to the user identifier and the App identifier from the user App status data table, and sends the user App status information to the application preprocessing module. The user App status management module also receives the request (the parameters are the user identifier, the App identifier, the user App status information) for uploading the user App status information sent by the application preprocessing module, and saves the user App status information into the table items corresponding to the user identifier and the App identifier in the user App status data table.

The terminal strategy processing module is connected to the scheduling strategy management module, the application dynamic scheduling module and the terminal configuration processing module. The terminal strategy processing module sends the request (the parameter is the user type identifier) for downloading the scheduling strategy to the scheduling strategy management module periodically or after receiving the request for downloading the scheduling strategy sent by the terminal configuration processing module, receives the scheduling strategy information returned by the scheduling strategy management module, analyzes the scheduling strategy information to obtain the display strategy, the timed task strategy, the operation mode strategy, and the status saving strategy of the App, and saves these strategies in the mobile terminal device to which the terminal strategy processing module belongs, for using at the time when the dynamic scheduling module carries out the dynamic scheduling computing. The terminal strategy processing module also receives the request (the parameter is the App identifier) for querying the App status saving strategy sent by the terminal configuration processing module. The terminal strategy processing module finds the status saving strategy of the application corresponding to the App identifier from the status saving strategy of the scheduling strategy information and sends the status saving strategy to the terminal configuration processing module.

The App silent operation module is connected to the application dynamic scheduling module and the terminal configuration processing module, in order to complete the installation and uninstallation task of the application in the background, without disturbing the user's use. The module receives the request (the parameter is the local installation package path) for App silent installation, sent by the application dynamic scheduling module or the terminal configuration processing module, and completes the silent installation task by obtaining the installation package file to be installed through the local installation package path. The module also receives the request (the parameter is the to-be-uninstalled App identifier) for App silent uninstallation sent by the application dynamic scheduling module and completes the silent uninstallation task according to the obtained to-be-uninstalled App identifier.

The application dynamic scheduling module is connected to the terminal strategy processing module, the App silent operation module, the application preprocessing module, and the App integration display module. During the operating process of the mobile terminal device, the module periodically completes the application dynamic scheduling tasks according to the display strategy, the timed task strategy, the operation mode strategy, and the status saving strategy of the App stored in the current mobile terminal device by the terminal strategy processing module with reference to the performance and security requirements of the mobile terminal device. The application dynamic scheduling module sends a request (the parameter is the local installation package path) for installing the App silently, to the App silent operation module, to trigger the App silent operation module to complete the installation task. The application dynamic scheduling module sends a request (the parameter is the to-be-uninstalled App identifier) for uninstalling the App silently, to the App silent operation module to trigger the App silent operation module to complete the uninstall task. The application dynamic scheduling module sends a request (the parameter is the App identifier) for obtaining the application installation package to the application preprocessing module to obtain the application installation package returned by the application preprocessing module. The application dynamic scheduling module sends a request (the parameter is the App identifier) for saving the user App status information to the application preprocessing module, to trigger the application preprocessing module to save the user App status information of the application corresponding to the App identifier of the user using the current mobile terminal device. The application dynamic scheduling module sends a request (the parameter is the App identifier) for recovering the user App status information, to the application preprocessing module, to trigger the application preprocessing module to recover the user App status information of the application corresponding to the App identifier of the user using the current mobile terminal device. The application dynamic scheduling module sends a request for updating the application display list, to the App integration display module, to trigger the App integration display module to update the application display list of the current mobile terminal device. The application dynamic scheduling module also sends a request (the parameter is the App identifier) for adjusting the App list order, to the App integration display module, to trigger the App integration display module to adjust the display order of the application corresponding to the App identifier in the application display list of the current mobile terminal device.

The terminal configuration processing module is connected to the user configuration management module, the terminal strategy processing module, the App silent operation module, the application preprocessing module and the App integration display module. The terminal configuration processing module periodically sends a request (the parameters are the user identifier and the user configuration information) for uploading the user configuration information to the user configuration management module, to send the user configuration information to the cloud server, so that the user can obtain a consistent application view on different mobile terminal devices, such that the user's ability of migrating between different mobile terminal devices is improved. When the user binds with the mobile terminal device, the terminal configuration processing module sends a request for downloading the scheduling strategy to the terminal strategy processing module, sends a request for updating the global App list to the App integration display module, sends a request (the parameter is the user identifier) for downloading the user configuration information to the user configuration management module, receives and analyzes the user configuration information returned by the user configuration management module to obtain the list of Apps installed on other mobile terminal devices used by the user, and then installs the application corresponding to each record of the list of installed Apps. The terminal configuration processing module sends a request (the parameter is the App identifier) for querying the App status saving strategy to the terminal strategy processing module to obtain the App status saving strategy returned by the terminal strategy processing module. If the App status saving strategy requires recovering the user App status information, a request for recovering the user App status information is sent to the application preprocessing module. The terminal configuration processing module sends a request (the parameter is the App identifier) for obtaining the application installation package to the application preprocessing module to obtain the installation package path returned by the application preprocessing module and uses the installation package path as a parameter to send the request for App silent installation to the App silent operation module. The terminal configuration processing module sends a request for updating the application display list to the App integration display module to trigger the App integration display module to update the application display list.

The application preprocessing module is connected to the global application management module, the user App status management module, the application dynamic scheduling module, and the terminal configuration processing module. The application preprocessing module receives the request (the parameter is the App identifier) for obtaining the application installation package sent by the application dynamic scheduling module and the terminal configuration processing module, uses the App identifier in the request for obtaining the application installation package as a parameter to send a request (the parameter is the App identifier) for downloading the application installation package to the global application management module, then saves the application installation package returned from the global application management module as the local application installation package, and returns the application installation package back to the application dynamic scheduling module and the terminal configuration processing module. The application preprocessing module receives a request (the parameter is the App identifier) for recovering the user App status information sent by the application dynamic scheduling module and the terminal configuration processing module, uses the App identifier in the request for recovering the user App status information and the user identifier of the user using the current mobile terminal device as parameters to send the request (the parameters are the user identifier, the App identifier) for downloading the user App status information to the user App status management module, and recovers the user App status information to the current mobile terminal device after receiving the user App status information returned from the user App status management module. The application preprocessing module also receives a request (the parameter is the App identifier) for saving the user App status information sent by the application dynamic scheduling module and the terminal configuration processing module, obtains the App status information of the designated App identifier from the mobile terminal device, and sends the request (the parameters are the user identifier, the App identifier, and the user App status information) for uploading the user App status information to the user App status management module.

The App integration display module is connected to the global application management module, the application dynamic scheduling module, and the terminal configuration processing module. The App integration display module is used for integrating and displaying the Applications that have already been installed on the mobile terminal device and the available App list obtained from the global application management module on the same interface of the mobile terminal device to provide the user with a unified and consistent view and operation entry for applications. The App integration display module sends a request (the parameter is the App classification identifier) for downloading the App list to the global application management module periodically or after receiving the request for updating the global App list sent by the terminal configuration processing module, obtains the available App list (including two pieces of information, the App identifier and the App classification identifier) from the global application management module, saves the App list in the related mobile terminal device, combines this App list with the installed App list of the related mobile terminal device, and displays the combined list in the application display list of the related mobile terminal device to provide the user with an interface for running the application. The App integration display module also receives the request for updating the application display list sent by the application dynamic scheduling module and the terminal configuration processing module, combines the installed App list of the related mobile terminal device with the App list obtained from the global application management module and stored in the current mobile terminal device to display the combined list in the application display list of the mobile terminal device. The App integration display module also receives the request (the parameter is the App identifier) for adjusting the App list order sent by the application dynamic scheduling module, adjusts the application corresponding to the App identifier in the application display list of the related mobile terminal device to a front end of the application display list of the mobile terminal device, and displays the application.

The second step is that the cloud management service subsystem is activated and the data center database is initialized. A system administrator adds the Application information to the Application data table, adds the scheduling strategy information of different types of users to the scheduling strategy data table, and adds the user and the default user configuration information to the user configuration data table through the global application management module, and initializes the user APP status data table to be void to get data support ready for all mobile terminal devices.

The third step is that the mobile terminal devices are operated in parallel under the support of the cloud-oriented stream scheduling system based on a customized Android platform. The third step further includes following steps.

3.1 The terminal configuration processing module authenticates the binding status of the related mobile terminal device by local status information of the mobile terminal device. If the current mobile terminal device is in the "unbound" status, the process goes to 3.2, if the current mobile terminal device is in the "bound" status, the process goes to 3.3 directly.

3.2 The terminal configuration processing module receives the user identifier information from a keyboard or a touch screen and binds with the mobile terminal device, wherein this step further includes the following steps.

3.2.1 The terminal configuration processing module sends a request (the parameter is the user identifier) for downloading the user configuration information to the user configuration management module to obtain the user configuration information returned by the user configuration management module.

3.2.2 The terminal configuration processing module reads the to-be-installed App list from the user configuration information and successively processes, from the first App record in the to-be-installed App list, each record in the to-be-installed App list, i.e. the installation is conducted according to the to-be-installed App list. This step further includes the following steps.

3.2.2.1 The terminal configuration processing module sends a request (the parameter is the App identifier) for querying the App status saving strategy to the terminal strategy processing module, to obtain the status saving strategy of the current to-be-installed App. If the obtained App status saving strategy is to recover the user App status information, a request (the parameter is the App identifier) for recovering the user App status information is sent to the application preprocessing module, the process goes to 3.2.2.2; otherwise, the process goes to 3.2.2.3 directly.

3.2.2.2 The application preprocessing module receives the request (the parameter is the App identifier) for recovering the user App status information sent by the terminal configuration processing module, sends a request (the parameters are the user identifier and the App identifier) for downloading the user App status information to the user App status management module, and recover the user App status information to the current mobile terminal device after receiving the user App status information returned back by the user App status management module.

3.2.2.3 The terminal configuration processing module sends a request (the parameter is the App identifier) for obtaining the application installation package to the application preprocessing module.

3.2.2.4 The application preprocessing module receives the request (the parameter is the App identifier) for obtaining the application installation package sent by the terminal configuration processing module and sends the request (the parameter is the App identifier) for downloading the application installation package to the global application management module by using the App identifier as the parameter, saves the application installation package returned by the global application management module as a local installation package file, and returns the local installation package path to the terminal configuration processing module.

3.2.2.5 The terminal configuration processing module receives the local installation package path, and sends the request (the parameter is the local installation package path) for the App silent installation to the App silent operation module with the path as the parameter. The App silent operation module receives the request (the parameter is the local installation package path) for the App silent installation sent by the terminal configuration processing module and executes an operation of App silent installation.

3.2.2.6 The terminal configuration processing module determines whether the record is the last record in the to-be-installed App list. If yes, the process goes to 3.2.3; otherwise, the process goes to 3.2.2.1 to process the next record in the to-be-installed App list.

3.2.3 The terminal configuration processing module sends a request for updating the global App list to the App integration display module. The App integration display module sends the request for downloading the App list to the global application management module after receiving the request, obtains the App list returned from the global application management module, stores the App list in the mobile terminal device, combines this App list with the installed App list of the mobile terminal device, and displays the combined list in the application display list of the related mobile terminal device.

3.3 The terminal configuration processing module sets the local status information of the related mobile terminal device as a "bound" status.

3.4 The terminal configuration processing module, the terminal strategy processing module, the App integration display module, and the application dynamic scheduling module are operated in parallel. The terminal configuration processing module periodically uploads the user configuration information to the cloud server according to the method described in 3.4.1. The terminal strategy processing module periodically downloads the scheduling strategy from the cloud server according to the method described in 3.4.2. The App integration display module periodically integrates the App list according to the method described in 3.4.3. The dynamic scheduling module periodically carries out application dynamic scheduling according to the method described in 3.4.4. Moreover, when an App on the mobile terminal device is terminated, the application dynamic scheduling module carries out the scheduling according to the method described in 3.4.5. When the mobile terminal device enters the working status of "bound", the terminal configuration processing module waits for the reception of a user's operation instruction according to the method described in 3.4.6. The operation is carried out according to different instructions, and this step further includes the following steps (3.4.1, 3.4.2, 3.4.3, 3.4.4, 3.4.5, 3.4.6 are conducted in parallel, there is no specific order).

3.4.1 The terminal configuration processing module periodically sends the request (the parameters are the user identifier, the user configuration information) for uploading the user configuration information to the user configuration management module by using the built-in timer of the Android system, and uploads the user configuration information to the cloud server.

3.4.2 The terminal strategy processing module periodically sends the request (the parameter is the user type identifier) for downloading the scheduling strategy to the scheduling strategy management module by using the built-in timer of the Android system, receives the scheduling strategy information returned by the scheduling strategy management module, analyze the scheduling strategy information to obtain the display strategy, the timed task strategy, the operation mode strategy, and the status saving strategy of the App, and saves these strategies in the current mobile terminal device for use when the dynamic scheduling module conducts the dynamic scheduling calculation.

3.4.3 The App integration display module periodically sends the request for downloading the App list to the global application management module using the built-in timer of the Android system, obtains the App list from the global application management module, saves the App list in the related mobile terminal device, combines the App list with the installed App list of the related mobile terminal device, and displays the combined list in the application display list of the related mobile terminal device.

3.4.4 The application dynamic scheduling module uses the built-in timer of the Android system to periodically carry out the application dynamic scheduling according to the display strategy, the timed task strategy, the operation mode strategy, and the status saving strategy of the App stored in the current mobile terminal device, by the terminal strategy processing module with reference to the requirements on performance and safety of the mobile terminal device. This step further includes the following steps.

3.4.4.1 The application dynamic scheduling module obtains the App, which needs to be periodically operated, according to the timed task strategy. If the App has been installed, the App runs directly, then the process goes to 3.4.4.2 to continue the scheduling task. If the App is not installed, the process goes to 3.5 to conduct the installation operation.

3.4.4.2 The Application dynamic scheduling module reads the display strategy to determine whether there is a newly added App needing "priority display" in the display strategy or not. If yes, the process goes to 3.8 to adjust the display order of the application in the application display list; otherwise, the process goes to 3.4.4.3 to continue the scheduling task.

3.4.4.3 The application dynamic scheduling module reads memory usage and system space usage of the related mobile terminal device through an API (Application Programming Interface) of the system. If the memory usage is greater than a memory threshold or the system space usage greater than a spatial threshold, the installed application list of the system is searched to obtain the App which has the operation mode strategy of "dynamic uninstall", is not running currently and has the least using frequency per day. Then the process goes to 3.6 to uninstall this App; otherwise, the process goes to 3.4.4 to wait for the next implementation of the periodic application dynamic scheduling task of the application dynamic scheduling module.

3.4.5 When the application dynamic scheduling module monitors termination of an App of the related mobile terminal device through the API of the system, the application dynamic scheduling module obtains the operation mode of the App according to the operation mode strategy. If the operation mode of the App is "stream execution", the process goes to 3.6 to perform the uninstall operation; otherwise, the process goes to 3.4.5 to wait for termination of the next App.

3.4.6 The terminal configuration processing module receives user's operation from the keyboard or the touch screen. If the user needs to remove the binding with the current mobile terminal device, the process goes to 3.7; if the user wants to turn off the power, the process goes to 3.9; if no operation is needed, then the process goes to 3.4.6 to continue to wait for the user's operation.

3.5 The application dynamic scheduling module conducts the silent installation task. This step further includes the following steps.

3.5.1 The application dynamic scheduling module determines whether the status information of the to-be-installed application needs to be recovered according to the status saving strategy obtained from 3.4.2. If yes, the process goes to 3.5.2, if not, the process goes to 3.5.3 directly.

3.5.2 The application dynamic scheduling module sends the request (the parameter is the App identifier) for recovering the user App status information to the application preprocessing module. The application preprocessing module sends a request (the parameters are the user identifier and the App identifier) for downloading the user App status information to the user App status management module after receiving the request for recovering the user App status information. The application preprocessing module recovers the user App status information to the current mobile terminal device after receiving the App status information returned by the user App status management module.

3.5.3 The application dynamic scheduling module sends the request (the parameter is the App identifier) for obtaining the application installation package to the application preprocessing module. After receiving the request for obtaining the application installation package, the application preprocessing module sends the request (the parameter is the App identifier) for downloading the application installation package to the global application management module. The application preprocessing module receives the application installation package returned by the global application management module, saves the application installation package as the local installation package file, and returns the local installation package path to the application dynamic scheduling module.

3.5.4 The application dynamic scheduling module obtains the local installation package path in 3.5.3 and sends the request (the parameter is the local installation package path) for App silent installation to the APP silent operation module. The App silent operation module completes the silent installation task through the installation package file obtained from the local installation package path after receiving the request for silent installation, and sends the request for updating the application display list to the App integration display module.

3.5.5 The App integration display module receives the request for updating the application display list sent by the application dynamic scheduling module, combines the installed App list of the related mobile terminal device with the App list obtained from the global application management module in step 3.4.3 (i.e. the App list before the combination in step 3.4.3), and displays the combined list in the application display list of the mobile terminal device.

3.5.6 Go to 3.4.4 to wait for the next implementation of the periodic application dynamic scheduling task of the application dynamic scheduling module.

3.6 The application dynamic scheduling module conducts the application silent uninstallation task. This step further includes the following steps.

3.6.1 The application dynamic scheduling module determines whether the status information of the to-be-uninstalled application needs to be saved according to the status saving strategy obtained in 3.4.2. If yes, the process goes to 3.6.2, otherwise, the process goes to 3.6.3 directly.

3.6.2 The application dynamic scheduling module sends a request for saving the user App status information to the application preprocessing module. The application preprocessing module receives the request, and sends the request for uploading the user App status information to the user App status management module. The user App status management module receives the request for uploading the user App status information sent by the application preprocessing module, and saves the user App status information into the user App status data table.

3.6.3 The application dynamic scheduling module sends the request for App silent uninstallation to the App silent operation module. The App silent operation module completes the silent uninstallation task according to an obtained to-be-uninstalled App identifier after receiving the request for App silent uninstallation, and sends the request for updating the application display list to the App integration display module.

3.6.4 The App integration display module receives the request for updating the application display list sent by the application dynamic scheduling module, combines the installed App list of the mobile terminal device with the App list stored in the current mobile terminal device and obtained from the global application management module in step 3.4.3, and displays the combined list in the application display list of the mobile terminal device.

3.6.5 Go to 3.4.4 to wait for the application dynamic scheduling module to perform the periodic application dynamic scheduling task for the next time.

3.7 The terminal configuration processing module performs the task of removing the user from the binding with the current mobile terminal device. This step further includes the following steps.

3.7.1 The terminal configuration processing module sends the request (the parameters are the user identifier and the user configuration information) for uploading the user configuration information to the user configuration management module, and uploads the user configuration information to the cloud server.

3.7.2 The terminal configuration processing module obtains the locally installed App list from the user configuration information, successively processes each of the installed App records in the list, starting with the first record in the installed App list. This step further includes the following steps.

3.7.2.1 The terminal configuration processing module sends the request (the parameter is the App identifier) for querying the App status saving strategy to the terminal strategy processing module to obtain the status saving strategy of the current to-be-uninstalled App. If the obtained App status saving strategy is to save the user App status information, the request for saving the user App status information is sent to the application preprocessing module, then the process goes to 3.7.2.2; otherwise, the process goes to 3.7.2.3.

3.7.2.2 The application preprocessing module sends the request (the parameter is the user identifier, the App identifier, and the user App status information) for uploading the user App status information to the user App status management module to upload the user App status information to the cloud server after receiving the request (the parameter is the App identifier) for saving the user App status information sent from the terminal configuration processing module.

3.7.2.3 The terminal configuration processing module determines whether the record is the last record in the installed App list. If yes, the process goes to 3.7.3; otherwise, the process goes to 3.7.2.1 to process the next record in the list.

3.7.3 The terminal configuration processing module clears the data of the mobile terminal device and restores the mobile terminal device to the factory settings.

3.7.4 Go to 3.2 to wait for the user to bind with the mobile terminal device.

3.8 The App integration display module adjusts the display order of the application display list. This step further includes the following steps.

3.8.1 The application dynamic scheduling module sends the request (the parameter is the App identifier) for adjusting the App list order to the App integration display module.

3.8.2 The App integration display module receives the request (the parameter is the App identifier) for adjusting the App list order sent from the application dynamic scheduling module, obtains the App identifier of the to-be-adjusted application, adjusts the application corresponding to the App identifier to be displayed at a front end of the application display list of the current mobile terminal device.

3.8.3 Go to 3.4.4 to wait for the application dynamic scheduling module to perform the periodic application dynamic scheduling task for the next time.

3.9 The mobile terminal device is shut down and the process is finished.

What is claimed is:

1. A cloud-oriented stream scheduling method based on an Android platform, comprising the following steps:
    a first step of building a cloud-oriented stream scheduling system based on an Android platform,
        wherein the system comprises two layers, one of the two layers is a cloud management service subsystem operated on a cloud server, another of the two layers is a core scheduling routine and an application (App) management routine operated in a mobile terminal device; the cloud management service subsystem provides services of application download, scheduling strategy access, user configuration access, and user App status access for all mobile terminal devices connected to the cloud management service subsystem in a parallel manner, and a data center database is installed on the cloud management service subsystem; the cloud management service subsystem obtains access information needed in a mobile terminal device access operation by querying the data center database;
    wherein the data center database further comprises four data tables corresponding to four services of the cloud management service subsystem, the four data tables includes: an application data table, wherein each table item of the application data table is entitled an App classification identifier, an App identifier, and an App installation package; a scheduling strategy data table, wherein each table item of the scheduling strategy data table is entitled a user type identifier, and a scheduling strategy information; a user configuration data table, wherein each table item of the user configuration data table is entitled a user identifier, and a user configuration information; an user App status data table, wherein each table item of the user App status data table is entitled the user identifier, the App identifier, and a user App status information;

wherein the App classification identifier indicates a class an App belongs to; the App identifier is a unique identifier to indicate a kind of the App; an App package file is stored in the App installation package; the user type identifier indicates a type of a user, wherein users of the same type have the same scheduling strategy; the user identifier is a unique identifier indicating the user of the mobile terminal device;

wherein the scheduling strategy information comprises a display strategy, a timed task strategy, an operation mode strategy, and a status saving strategy of the App; the display strategy is a list of N1 records, the content of each of the N1 records includes the App identifier, and a display manner; the display manner indicates an App display order corresponding to the App identifier and the display manner is one selected from the group consisting of "fixed", "dynamically adjusted" and "preferential"; and N1 is equal to the number of applications controlled by the display strategy; the timed task strategy is a list of M records, the content of each of the M records includes the App identifier, and an operation time; the App corresponding to the App identifier will operate automatically within a time specified by the operation time, and M is equal to the number of applications controlled by the timed task strategy; the operation mode strategy is a list of K records, the contents of each of the K records include the App identifier, and an operation mode; the operation mode indicates that the App corresponding to the App identifier is one-off "stream execution", "uninstallation prohibited" resident in system, or "dynamically uninstallation" determined by the core scheduling routine, and K is equal to the number of the applications controlled by the operation mode strategy; the status saving strategy is a list with L records, the content of each of the L records include the App identifier, and a whether to save indicator; the whether to save indicator indicates whether the status information of the App corresponding to the App identifier needs to be uploaded to the cloud management service subsystem before uninstallation and whether the status information of the App corresponding to the App identifier is needed to be downloaded and restored to a mobile smart terminal currently used by a user after installation, and L is equal to the number of the applications controlled by the status saving strategy;

wherein the user configuration information is a data list with N2 records, the content of each of the N2 records includes the App identifier, an application usage frequency, and an application display order; the application usage frequency records an average daily usage frequency of the application corresponding to the App identifier after the App is installed, and the application display order indicates the order and the location that the App is displayed in the display list, N2 is equal to the number of applications that have been installed in the mobile terminal device used by the user;

Wherein the user App status information is a file that stores the content related to status and configuration of the App corresponding to the App identifier used by the user corresponding to the user identifier;

wherein the core scheduling routine and the App management routine is running on each of the mobile terminal devices, wherein the core scheduling routine provides a plurality of functions including a scheduling strategy processing, a silent installation or an App uninstallation, and a dynamic App adjustment, and performs a specific scheduling task of stream computing; the App management routine provides a plurality of functions including a user configuration processing, an App integration and display, and an App pre-processing before the installation and the uninstallation, including a plurality of functions such as an apk installation file downloading, a user App status information downloading, and a user App status information uploading;

wherein an HTTP protocol is used between the cloud management service subsystem and each of the core scheduling routine and the App management routine for allowing a communication, and an Android internal broadcast mechanism is used between the core scheduling routine and the App management routine for allowing the communication to asynchronously implement a plurality of internal functions in a message-driven manner;

wherein the cloud management service subsystem further comprises a global application management module, a scheduling strategy management module, a user configuration management module, and a user App status management module; the core scheduling routine further comprises a terminal strategy processing module, an App silent operation module, and an application dynamic scheduling module; the App management routine further comprises a terminal configuration processing module, an application pre-processing module, and an App integration display module;

wherein, the global application management module is connected to the application preprocessing module, the App integration display module, and the data center database; the global application management module receives a request for downloading an application installation package with the App identifier as a parameter sent by the application preprocessing module, finds an App installation package URL corresponding to the App identifier from the Application data table, and sends an App installation package corresponding to the App installation package URL to the Application preprocessing module; the global application management module also receives the request for downloading an App list with the App classification identifier as a parameter sent by the App integration display module, and finds all Apps belonging to the App classification identifier from the application data table to form the App list, and sends the App list to the App integration display module, wherein the App list includes two pieces of information, the two pieces of information includes the App identifier in the application data table and the App classification identifier;

wherein the scheduling strategy management module is connected to the terminal strategy processing module and the data center database; the scheduling strategy management module receives are quest for downloading a scheduling strategy with the App type identifier as a parameter sent by the terminal strategy processing module, finds scheduling strategy information corresponding to the user type identifier from the scheduling strategy data table, and sends the scheduling strategy information corresponding to the user type identifier to the terminal strategy processing module;

wherein the user configuration management module is connected to the terminal configuration processing module and the data center database; the user configuration management module receives a request for downloading user configuration information with the user identifier as the parameter sent by the terminal configuration processing module, finds user configuration information corresponding to the user identifier from the user configuration data table, and sends the user configuration information corresponding to the user identifier to the terminal configuration processing module; the user configuration management module also receives a request for uploading user configuration information with the user identifier and the user configuration information corresponding to the user identifier as the parameters sent by the terminal configuration processing module, and saves the user configuration information corresponding to the user identifier into the a table item corresponding to the user identifier in the user configuration data table;

wherein the user App status management module is connected to the application preprocessing module and the data center database; the user App status management module receives a request for downloading user App status information with the user identifier and the App identifier as parameters sent by the application preprocessing module, finds the user App status information corresponding to the user identifier and the App identifier from the user App status data table, and sends the user App status information corresponding to the user identifier and the App identifier to the application preprocessing module; the user App status management module also receives a request for uploading the user App status information with the user identifier, the App identifier, and the user App status information corresponding to the user identifier and the App identifier as parameters sent by the application preprocessing module, and saves the user App status information corresponding to the user identifier and the App identifier into a table item corresponding to the user identifier and the App identifier in the user App status data table;

wherein the terminal strategy processing module is connected to the scheduling strategy management module, the application dynamic scheduling module and the terminal configuration processing module; the terminal strategy processing module sends a request for downloading a scheduling strategy with the user type identifier as a parameter to the scheduling strategy management module periodically or after receiving a request for downloading a scheduling strategy sent by the terminal configuration processing module, receives scheduling strategy information returned by the scheduling strategy management module, analyzes the scheduling strategy information returned by the scheduling strategy management module to obtain the display strategy, the timed task strategy, the operation mode strategy, and the status saving strategy of the App, and saves these strategies in the mobile terminal device to which the terminal strategy processing module belongs; the terminal strategy processing module also receives a request for querying an App status saving strategy with the App identifier as a parameter sent by the terminal configuration processing module, the terminal strategy processing module finds the App status saving strategy of an application corresponding to the App identifier from a status saving strategy of the scheduling strategy information, and sends the App status saving strategy to the terminal configuration processing module;

wherein the App silent operation module is connected to the application dynamic scheduling module and the terminal configuration processing module for completing an installation and uninstallation task of an application in a background without disturbing the user's use, the App silent operation module receives a request for installing the App silently with a local installation package path as a parameter sent by the application dynamic scheduling module or the terminal configuration processing module, and completes a silent installation task by obtaining an installation package file to be installed through the local installation package path; the App silent operation module also receives a request for uninstalling the App silently with a to-be-uninstalled App identifier as a parameter sent by the application dynamic scheduling module, and completes a silent uninstallation task according to an obtained to-be-uninstalled App identifier;

wherein the application dynamic scheduling module is connected to the terminal strategy processing module, the App silent operation module, the application preprocessing module, and the App integration display module; during an operating process of the mobile terminal device, the application dynamic scheduling module periodically completes an application dynamic scheduling task according to the display strategy, the timed task strategy, the operation mode strategy, and the status saving strategy of the App stored in the current mobile terminal device by the terminal strategy processing module with reference to a performance and security requirement of the mobile terminal device, the application dynamic scheduling module sends a request for installing the App silently with the local installation package path as a parameter to the App silent operation module to trigger the App silent operation module to complete an installation task; the application dynamic scheduling module sends a request for uninstalling the App silently with the to-be-uninstalled App identifier as a parameter to the App silent operation module to trigger the App silent operation module to complete an uninstallation task; the application dynamic scheduling module sends a request for obtaining the application installation package with the App identifier as a parameter to the application preprocessing module to obtain the application installation package returned by the application preprocessing module; the application dynamic scheduling module sends a request for saving the user App status information with the App identifier as a parameter to the application preprocessing module to trigger the application preprocessing module to save the user App status information of the application corresponding to the App identifier of the user using a current mobile terminal device; the application dynamic scheduling module sends a request for recovering the user App status information with the App identifier as a parameter to the application preprocessing module to trigger the application preprocessing module to recover the user App status information of the application corresponding to the App identifier of the user using the current mobile terminal device; the application dynamic scheduling module sends a request for updating the display list of the applications to the App integration display module to trigger the App integration display module to update the display list of the applications of the current mobile terminal device; the application dynamic scheduling module also sends a request for adjusting an App list order with the App identifier as a parameter to the App integration display module to trigger the App integration display module to adjust a display order of an application corresponding to the App identifier in the display list of the applications of the current mobile terminal device;

wherein the terminal configuration processing module is connected to the user configuration management module, the terminal strategy processing module, the App silent operation module, the application preprocessing module and the App integration display module; the terminal configuration processing module periodically sends a request for uploading the user configuration information with the user identifier and the user configuration information as parameters to the user configuration management module to send the user configuration information to the cloud server; when the user is binding with the mobile terminal device, the terminal configuration processing module sends a request for downloading the scheduling strategy to the terminal strategy processing module, sends a request for updating a global App list to the App integration display module, sends a request for downloading the user configuration information with the user identifier as a parameter to the user configuration management module, receives and analyzes the user configuration information returned by the user configuration management module to obtain a list of installed App on other mobile terminal devices having been used by the user, and then installs an application corresponding to each record in the list of installed App; the terminal configuration processing module sends a request for querying the App status saving strategy with the App identifier as a parameter to the terminal strategy processing module to obtain the App status saving strategy returned by the terminal strategy processing module; if the App status saving strategy requires recovering the user App status information, a request for recovering the user App status information is sent to the application preprocessing module; the terminal configuration processing module sends a request for obtaining the application installation package with the App identifier as a parameter to the application preprocessing module to obtain the installation package path returned by the application preprocessing module, and uses the installation package path as a parameter to send a request for App silent installation to the App silent operation module; the terminal configuration processing module sends a request for updating the display list of the applications to the App integration display module to trigger the App integration display module to update the display list of the applications;

wherein the application preprocessing module is connected to the global application management module, the user App status management module, the application dynamic scheduling module and the terminal configuration processing module; the application preprocessing module receives a request for obtaining the application installation package with the App identifier as a parameter sent by the application dynamic scheduling module and the terminal configuration processing module, uses the App identifier in the request for obtaining application installation package as the parameter to send a request for downloading the application installation package to the global application management module, and then saves the application installation package returned from the global application management module as a local application installation package and returns the local application installation package back to the application dynamic scheduling module and the terminal configuration processing module; the application preprocessing module receives a request for recovering the user App status information with the App identifier as a parameter sent by the application dynamic scheduling module and the terminal configuration processing module, uses the App identifier in the request for recovering the user App status information and the user identifier of the user using the current mobile terminal device as parameters to send the request for downloading the user App status information with the user identifier and the App identifier as the parameters to the user App status management module, and recovers the user App status information to the current mobile terminal device after receiving the user App status information returned from the user App status management module; the application preprocessing module also receives the request for saving the user App status information with the App identifier as a parameter sent by the application dynamic scheduling module and the terminal configuration processing module, obtains the App status information of a designated App identifier from the mobile terminal device, and sends the request for uploading the user App status information with the user identifier, the App identifier, and the user App status information as parameters to the user App status management module;

wherein the App integration display module is connected to the global application management module, the application dynamic scheduling module, and the terminal configuration processing module; the App integration display module is used for integrating and displaying the applications installed on the mobile terminal device and an available App list obtained from the global application management module on the same interface of the mobile terminal device and providing the user with a unified and consistent view and an operation entry for the application; the App integration display module sends a request for downloading the App list with the App classification identifier as a parameter to the global application management module periodically or after receiving the request for updating the global App list sent by the terminal configuration processing module, obtains the available App list from the global application management module saves the available App list in the mobile terminal device, and the App list and an installed App list of the mobile terminal device are combined to be displayed in the display list of the applications of the mobile terminal device to provide the user an interface for running the applications; the App integration display module also receives the request for updating the application display list sent by the application dynamic scheduling module and the terminal configuration processing module, and the installed App list of the mobile terminal device and the App list obtained from the global application management module and stored in the current mobile terminal device are combined to be displayed on the display list of the applications of the mobile terminal device; the App integration display module also receives the request for adjusting the App list order with the App identifier as a parameter sent by the application dynamic scheduling module, adjusts the application corresponding to the App identifier in the display list of the applications of the mobile terminal device is adjusted to display to a front end of the application display list of the mobile terminal device, and display the application;

a second step of activating the cloud management service subsystem and initializing the data center database;
wherein a system administrator adds application information to the application data table, adds the scheduling strategy information of different types of users to the scheduling strategy data table, and adds the user and default user configuration information to the user configuration data table through the global application management module, and initializes the user App status data table to be void to get a data support ready for all of the mobile terminal devices;

a third step of operating the mobile terminal devices in parallel under a support of the cloud-oriented stream scheduling system based on a customized Android platform, comprising the following steps:

3.1 the terminal configuration processing module authenticating a binding status of the mobile terminal device by local status information of the mobile terminal device; wherein the binding status of the mobile terminal device being "bound" means that a user has logged on to use the mobile terminal device, and the binding status being "unbound" means that the user has not logged on to use the mobile terminal device; the core scheduling routine and the App management routine operated on the mobile terminal device can obtain the user identifier and the user type identifier of a current user by the local status information of the mobile terminal device; if the current mobile terminal device is at an "unbound" status, going to 3.2, if the current mobile terminal device is in a "bound" status, going to 3.3 directly;

3.2 the terminal configuration processing module receiving user identifier information from a keyboard or a touch screen and binding with the mobile terminal device, wherein 3.2 further comprises the following steps:

3.2.1 the terminal configuration processing module sending the request for downloading the user configuration information with the user identifier as a parameter to the user configuration management module to obtain the user configuration information returned by the user configuration management module;

3.2.2 the terminal configuration processing module reading the to-be-installed App list from the user configuration information and successively processing, from the first App record in the to-be-installed App list, each record in the to-be-installed App list, namely, installing according to the to-be-installed App list;

3.2.3 the terminal configuration processing module sending the request for updating the global App list to the App integration display module; wherein the App integration display module sends the request for downloading the App list to the global application management module after receiving the request, obtains the App list returned from the global application management module, stores the App list in the mobile terminal device, and the obtained App list and the installed App list of the mobile terminal device are combined to be displayed in the display list of the applications of the mobile terminal device;

3.3 the terminal configuration processing module setting the local status information of the mobile terminal device to the "bound" status;

3.4 operating the terminal configuration processing module, the terminal strategy processing module, the App integration display module, and the application dynamic scheduling module in parallel; wherein the terminal configuration processing module periodically uploads the user configuration information to the cloud server according to the method described in 3.4.1, the terminal strategy processing module periodically downloads the scheduling strategy from the cloud server according to the method described in 3.4.2, the App integration display module periodically integrates the App list according to the method described in 3.4.3, the application dynamic scheduling module periodically carries out an application dynamic scheduling according to the method described in 3.4.4; when the App on the mobile terminal device is terminated, the application dynamic scheduling module carries out the application dynamic scheduling according to the method described in 3.4.5; when the mobile terminal device enters a working status of "bound", the terminal configuration processing module waits for a reception of a user's operational instruction according to the method described in 3.4.6; wherein an operation of operating the terminal configuration processing module, the terminal strategy processing module, the App integration display module, and the application dynamic scheduling module in parallel is carried out according to a plurality of different instructions, and 3.4.1, 3.4.2, 3.4.3, 3.4.4, 3.4.5, 3.4.6 are conducted in parallel;

3.4.1 the terminal configuration processing module periodically sending the request for uploading the user configuration information with the user identifier and the user configuration information as parameters to the user configuration management module using a built-in timer of the Android system, and uploading the user configuration information to the cloud server;

3.4.2 the terminal strategy processing module periodically sending the request for downloading the scheduling strategy with the user type identifier as a parameter to the scheduling strategy management module using the built-in timer of the Android system, receiving the scheduling strategy information returned by the scheduling strategy management module, analyzing the scheduling strategy information to obtain the display strategy, the timed task strategy, the operation mode strategy, and the status saving strategy of the App, and saving these strategies in the current mobile terminal device;

3.4.3 the App integration display module periodically sending the request for downloading the App list to the global application management module using the built-in timer of the Android system, obtaining the App list from the global application management module, saving the App list in the mobile terminal device, combining the App list with the installed App list of the mobile terminal device, and displaying the combined App list in the application display list of the mobile terminal device;

3.4.4 the application dynamic scheduling module using the built-in timer of the Android system to periodically carry out the application dynamic scheduling according to the display strategy, the timed task strategy, the operation mode strategy, and the status saving strategy of the App stored in the current mobile terminal device by the terminal strategy processing module with reference to requirement on performance and safety of the mobile terminal device, 3.4.4 further comprises the following steps:

3.4.4.1 the application dynamic scheduling module obtaining the App needing to be periodically operated according to the timed task strategy; if the App has been installed, the App runs directly, then going to 3.4.4.2 to continue the scheduling task; if the App is not installed, going to 3.5 to conduct the installation operation;

3.4.4.2 the Application dynamic scheduling module reading the display strategy to determine whether there is a newly added App needing a "priority display" in the display strategy or not; if yes, going to 3.8 to adjust the display order of the applications in the display list of the applications; otherwise, going to 3.4.4.3 to continue the scheduling task;

3.4.4.3 the application dynamic scheduling module reading a memory usage and a system space usage of the mobile terminal device through an Application Programming Interface (API) of the system; if the memory usage is greater than a memory threshold or the system space usage is greater than a spatial threshold, searching the installed application list of the system to obtain the App that has an operation mode strategy of "dynamic uninstall", is not running currently, and has the least daily using frequency, then going to 3.6 to conduct an uninstall operation; otherwise going to 3.4.4;

3.4.5 when the application dynamic scheduling module monitors a termination of an App of the mobile terminal device, the application dynamic scheduling module obtaining an operation mode of the App according to the operation mode strategy; if the operation mode of the App is a "stream execution", going to 3.6 to perform the uninstall operation; otherwise, going to 3.4.5;

3.4.6 the terminal configuration processing module receiving the user's operation by the keyboard or the touch screen; if the user needs to remove the binding with the current mobile terminal device, going to 3.7; if the user wants to turn off a power, going to 3.9; if no operation is needed, going to 3.4.6;

3.5 the application dynamic scheduling module conducting the silent installation task, then going to 3.4.4;

3.6 the application dynamic scheduling module conducting the application silent uninstallation task, then going to 3.4.4;

3.7 the terminal configuration processing module conducting a task of removing the user from the binding with the current mobile terminal device, then going to 3.2;

3.8 the App integration display module adjusting the display order of the display list of the applications;

3.9 shutting down the mobile terminal device.

2. The cloud-oriented stream scheduling method based on an Android platform of claim 1, wherein the user App status information is a file packed from three directories, a process of saving the user App status is a process of saving the file; a process of recovering the user App status is a process of unpacking the file so as to recover the file into the three directories; the three directories comprises:

a /data/data/<package name/directory, wherein package name refers to an App package name, a /sdcard/Android/data/<package name>/directory, and a predetermined directory in a non-system partition of the mobile terminal device, wherein the predetermined directory designated by the App has the rights to read and write.

3. The cloud-oriented stream scheduling method based on an Android platform of claim 1, wherein a combination refers to adding information of applications having not been installed on the current mobile terminal of the App list obtained from the global application management module into the App list of applications having been installed on the current mobile terminal to form a new App list.

4. The cloud-oriented stream scheduling method based on an Android platform of claim 1, wherein the step 3.2.2 where the terminal configuration processing module successively processes each record of the to-be-installed App in the to-be-installed App list comprises the following steps:

3.2.2.1 the terminal configuration processing module sending a request for querying the App status saving strategy with the App identifier as a parameter to the terminal strategy processing module to obtain the status saving strategy of a current to-be-installed App; if an obtained App status saving strategy is to recover the user App status information, the terminal configuration processing module sending a request for recovering the user App status information with the App identifier as a parameter to the application preprocessing module, then going to 3.2.2.2; otherwise, going to 3.2.2.3 directly;

3.2.2.2 the application preprocessing module receiving the request for recovering the user App status information with the App identifier as a parameter sent by the terminal configuration processing module, sending the request for downloading the user App status information with the user identifier and the App identifier as parameters to the user App status management module, and recovering the user App status information to the current mobile terminal device after receiving the user App status information returned back by the user App status management module;

3.2.2.3 the terminal configuration processing module sending the request for obtaining the application installation package with the App identifier as a parameter to the application preprocessing module;

3.2.2.4 the application preprocessing module receiving the request for obtaining the application installation package with the App identifier as a parameter sent by the terminal configuration processing module, using the App identifier as a parameter to send the request for downloading the application installation package with the App identifier as a parameter to the global application management module, saving the application installation package returned by the global application management module as a local installation package file, and returning the local installation package path to the terminal configuration processing module;

3.2.2.5 the terminal configuration processing module receiving the local installation package path, and using the local installation package path as a parameter to send the request for the App silent installation with the local installation package path as a parameter to the App silent operation module; the App silent operation module receiving the request for the App silent installation sent by the terminal configuration processing module and executing an operation of installing the App silently;

3.2.2.6 the terminal configuration processing module determining whether a record is the last record of the to-be-installed App list, if yes, going to 3.2.3, otherwise, going to 3.2.2.1.

5. The cloud-oriented stream scheduling method based on an Android platform of claim 1, wherein in the step 3.4.4.3, the memory threshold is 60%, and the spatial threshold is 75%.

6. The cloud-oriented stream scheduling method based on an Android platform of claim 1, wherein the step 3.5 where the application dynamic scheduling module conducts the silent installation task comprises the following steps:

3.5.1 the application dynamic scheduling module determining whether status information of the to-be-installed application needs to be recovered or not according to the status saving strategy obtained from 3.4.2, if yes, going to 3.5.2, if not, going to 3.5.3 directly;

3.5.2 the application dynamic scheduling module sending the request for recovering the user App status information with the App identifier as a parameter to the application preprocessing module, the application preprocessing module sending a request for downloading the user App status information with the user identifier and the App identifier as parameters to the user App status management module after receiving the request for recovering the user App status information, the application preprocessing module recovering the user App status information to the current mobile terminal device after receiving the App status information returned by the user App status management module;

3.5.3 the application dynamic scheduling module sending the request for obtaining the application installation package with the App identifier as a parameter to the application preprocessing module, the application preprocessing module sending the request for downloading the application installation package with the App identifier as a parameter to the global application management module after receiving the request for obtaining the application installation package, the application preprocessing module receiving the application installation package returned by the global application management module, saving the application installation package as the local installation package file, and returning the local installation package path to the application dynamic scheduling module;

3.5.4 the application dynamic scheduling module sending the request for installing the App silently with the local installation package path as a parameter to the APP silent operation module after obtaining the local installation package path, the App silent operation module completing the silent installation task via a to-be-installed installation package file obtained from the local installation package path after receiving the request for silent installation, and sending the request for updating the application display list to the App integration display module;

3.5.5 the App integration display module receiving the request for updating the application display list sent by the application dynamic scheduling module, combining the installed App list of the mobile terminal device with the App list obtained from the global application management module in step 3.4.3, and displaying combined list in the application display list of the mobile terminal device.

7. The cloud-oriented stream scheduling method based on an Android platform of claim 1, wherein the step 3.6 where the application dynamic scheduling module performing the silent uninstallation task comprises the following steps:

3.6.1 the application dynamic scheduling module determining whether the status information of a to-be-uninstalled application needs to be saved according to the status saving strategy obtained from 3.4.2, if yes, going to 3.6.2, otherwise, going to 3.6.3 directly;

3.6.2 the application dynamic scheduling module sending the request for saving the user App status information to the application preprocessing module, the application preprocessing module receiving the request for saving the user App status information to the application preprocessing module and sending the request for uploading the user App status information to the user App status management module; the user App status management module receiving the request for uploading the user App status information sent by the application preprocessing module and saving the user App status information into the user App status data table;

3.6.3 the application dynamic scheduling module sending the request for uninstalling the App silently to the App silent operation module, the App silent operation module completing the silent uninstallation task according to an obtained to-be-uninstalled App identifier after receiving the request for uninstalling the App silently, and sending the request for updating the display list of the applications to the App integration display module;

3.6.4 the App integration display module receiving the request for updating the display list of the applications sent by the application dynamic scheduling module, combining the installed App list of the mobile terminal device with an App list stored in the current mobile terminal device obtained from the global application management module in step 3.4.3, and displaying a combined list in the display list of the applications of the mobile terminal device.

8. The cloud-oriented stream scheduling method based on an Android platform of claim 1, wherein the step 3.7 where the terminal configuration processing module performing the task of removing the user from the binding with the current mobile terminal device comprises the following steps:

- 3.7.1 the terminal configuration processing module sending the request for uploading the user configuration information with the user identifier and the user configuration information as parameters to the user configuration management module to upload the user configuration information to the cloud server;
- 3.7.2 the terminal configuration processing module obtaining a locally installed App list from the user configuration information, successively processing, from a first record in the installed App list, each of the installed App records in the installed App list, wherein, the step 3.7.2 comprises the following steps:
- 3.7.2.1 the terminal configuration processing module sending the request for querying the App status saving strategy with the App identifier as a parameter to the terminal strategy processing module to obtain the status saving strategy of a current to-be-uninstalled App; if the obtained App status saving strategy is to save the user App status information, the terminal configuration processing module sending the request for saving the user App status information to the application preprocessing module, then going to 3.7.2.2; otherwise going to 3.7.2.3;
- 3.7.2.2 the application preprocessing module sending the request for uploading the user App status information to the user App status management module with the user identifier, the App identifier, and the user App status information as parameters to upload the user App status information to the cloud server after receiving the request for saving the user App status information with the App identifier as the parameter sent from the terminal configuration processing module;
- 3.7.2.3 the terminal configuration processing module determining whether the record is the last record in the installed App list, if yes, going to 3.7.3, otherwise, processing a next record in the installed App list;
- 3.7.3 the terminal configuration processing module clearing data of the mobile terminal device and restoring the mobile terminal device to a factory setting.

9. The cloud-oriented stream scheduling method based on an Android platform of claim 1, wherein the step 3.8 where the App integration display module adjusts the display order of the display list of the applications comprises the following steps:

- 3.8.1 the application dynamic scheduling module sending the request for adjusting the App list order with the App identifier as a parameter to the App integration display module;
- 3.8.2 the App integration display module receiving the request for adjusting the App list order with the App identifier as a parameter sent from the application dynamic scheduling module, obtaining the App identifier of a to-be-adjusted application, and adjusting the application corresponding to the App identifier to be displayed at the front end of the display list of the applications of the current mobile terminal device.

10. The cloud-oriented stream scheduling method based on an Android platform of claim 1, wherein a periodic process is customized daily or hourly according to an energy consumption and a traffic.

* * * * *